United States Patent
Zacher

(10) Patent No.: US 10,522,879 B2
(45) Date of Patent: Dec. 31, 2019

(54) COOLING CIRCUIT FOR A BATTERY HAVING A BUCHHOLZ RELAY

(71) Applicant: Dr. Ing. h.c. F. Porsche Aktiengesellschaft, Stuttgart (DE)

(72) Inventor: Marcus Zacher, Sindelfingen (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 135 days.

(21) Appl. No.: 15/866,931

(22) Filed: Jan. 10, 2018

(65) Prior Publication Data

US 2018/0212280 A1 Jul. 26, 2018

(30) Foreign Application Priority Data

Jan. 24, 2017 (DE) .................. 10 2017 101 242

(51) Int. Cl.
| | |
|---|---|
| *H01M 10/613* | (2014.01) |
| *H01M 10/42* | (2006.01) |
| *H01M 10/6568* | (2014.01) |
| *H01M 10/625* | (2014.01) |
| *H01M 10/0525* | (2010.01) |

(52) U.S. Cl.
CPC ....... *H01M 10/425* (2013.01); *H01M 10/613* (2015.04); *H01M 10/625* (2015.04); *H01M 10/6568* (2015.04); *H01M 10/0525* (2013.01); *H01M 2220/20* (2013.01)

(58) Field of Classification Search
CPC ............. H01M 10/425; H01M 10/625; H01M 10/6568; H01M 10/613; H01M 10/0525; H01M 2220/20; Y02E 60/122; Y02T 10/7005
See application file for complete search history.

(56) References Cited

U.S. PATENT DOCUMENTS

| | | | |
|---|---|---|---|
| 9,217,690 B2 | 12/2015 | Skelton et al. | |
| 2013/0197745 A1* | 8/2013 | Skelton ............... | G01M 17/007 |
| | | | 701/34.4 |
| 2014/0190241 A1 | 7/2014 | Namou et al. | |

FOREIGN PATENT DOCUMENTS

| | | |
|---|---|---|
| DE | 115971 A1 | 10/1975 |
| DE | 102013201205 A1 | 10/2013 |
| DE | 102014100008 A1 | 7/2014 |

OTHER PUBLICATIONS

German Search Report for German Application No. 10 2017 101 242.7, dated Oct. 12, 2017 with partial English translation, 8 Pages.

* cited by examiner

*Primary Examiner* — Cynthia K Walls
(74) *Attorney, Agent, or Firm* — RatnerPrestia

(57) ABSTRACT

A cooling circuit for a liquid-cooled electric battery, in particular for a liquid-cooled electric battery in an electrically operated vehicle, having an encircling coolant line, a heat exchanger arranged in the coolant line, and a coolant pump for transporting a cooling liquid through the coolant line. The cooling circuit has a Buchholz relay which is arranged in the coolant line and which has a signal output for connecting to a monitoring unit. Also disclosed is a liquid-cooled battery arrangement having a liquid-cooled battery, a cooling circuit as above, and a cooling liquid, wherein the liquid-cooled battery is connected to the coolant line, and the cooling circuit and the liquid-cooled battery are filled with the cooling liquid. Also disclosed is a vehicle having such a liquid-cooled battery arrangement.

7 Claims, 2 Drawing Sheets

COOLING CIRCUIT FOR A BATTERY HAVING A BUCHHOLZ RELAY

CROSS-REFERENCE TO RELATED APPLICATION

This application claims priority to German Patent Application No. DE 10 2017 101 242.7, filed Jan. 24, 2017, the content of such application being incorporated by reference herein in its entirety.

FIELD OF THE INVENTION

The present invention relates to a cooling circuit for a liquid-cooled electric battery, in particular for a liquid-cooled electric battery in an electrically operated vehicle, having an encircling coolant line, a heat exchanger arranged in the coolant line, and a coolant pump for transporting a cooling liquid through the coolant line.

Furthermore, the invention relates to a liquid-cooled battery arrangement having a liquid-cooled battery, and a cooling circuit as specified above, and a cooling liquid, wherein the liquid-cooled battery is connected to the coolant line, and the cooling circuit and the liquid-cooled battery are filled with the cooling liquid.

Likewise, the invention relates to a vehicle having a liquid-cooled battery arrangement as specified above.

The invention also relates to the use of a Buchholz relay.

BACKGROUND OF THE INVENTION

Efficient batteries are nowadays becoming increasingly important for driving electrically operated vehicles. Such vehicles can be embodied for example as purely electric vehicles, or as vehicles having an electric auxiliary drive, for example in the manner of a hybrid vehicle.

Here, the batteries have to supply ever greater instantaneous powers and additionally have a high storage capacity. In this case, batteries having operating voltages of several hundred volts are nowadays known. Therefore, special high-power batteries, for example lithium-ion batteries, are frequently necessary in order to be able to meet these requirements. In the batteries, it is conventional to connect a plurality of individual battery cells together in parallel and/or in series in order to be able to achieve desired voltages and currents.

In order to improve the efficiency of such high-power batteries and also to achieve a long service life, it is advantageous to cool the cells of the high-power batteries. The prior art contains various cooling concepts, of which some of the most important are mentioned below.

First of all, cooling with water, or with water glycol, is widespread, since this type of cooling is already common in vehicles with conventional drives, i.e. with internal combustion engines. A safety-critical drawback of the use of this cooling medium is the electrical conductivity thereof. In the event of the cooling circuit leaking, for example as a result of an accident, the escaping water or water glycol can cause short circuits. As a result fires and other emergency situations can be caused, and this can in turn lead to additional and sometimes considerable damage to the vehicle. In order to reduce this risk, cooling systems with water or water glycol have in the meantime preferably been embodied such that they cool the battery only outside the battery housing thereof. However, this has the drawback that the heat transfer from the individual cells to the cooling system is slow and local high temperatures can arise in the battery. In particular, a temperature gradient can form in the battery, wherein the cells in the interior of the battery are at a higher temperature than the housing of the battery, on which the cooling system acts. As a result, it is possible for sufficient cooling of the battery not to be able to be ensured in demanding operating situations, with the result that the operational safety of the vehicle is limited.

Alternatively, cooling of the battery with air is known. The heat capacity of air is low compared with water, however, and so a high volumetric flow is required in order to be able to cool the battery sufficiently. This can be ensured only with difficulty and requires sometimes additional components which, on account of the rising costs, their size or of operating noise, are unacceptable.

Likewise, cooling with a particular coolant, for example R1234yf or R134a, is common. These coolants are used for example in air conditioning systems of vehicles. However, these coolants are sometimes difficult to handle and/or not desirable for reasons of environmental protection or operational safety. In addition, these coolants are designed for heat absorption and heat output by evaporation and condensation, this requiring a complicated cooling circuit with corresponding components, i.e. an evaporator and a condenser.

One possibility for cooling the battery consists in using insulating oil as coolant. With this coolant, it is possible in principle to guide the coolant closer to the cells, or even to make the coolant flow directly around the cells. In this way, effective and uniform heat transfer from the individual cells to the coolant can be ensured. However, a problem here is that there is in principle the risk of short circuits of the cells when an insulation fault occurs. Such an insulation fault can occur for example when the coolant is contaminated or in particular water gets into the cooling circuit.

In this connection, DE 10 2013 201 205 A1, which is incorporated by reference herein, discloses a motor-vehicle battery module having one or more battery cells and a coolant loss detection and remedy system which interacts with the coolant and is configured to provide temperature management of the battery module. Coolant levels in or around the battery module can be detected, wherein the interaction with a controller allows a corrective measure if a coolant leak is detected. The controller reads a coolant level sensor which is arranged in a coolant storage tank, in order to establish whether the coolant level drops below a predetermined level. If it is established that the coolant level is low, the controller signals the low level and takes countermeasures. The controller also has a set of activation conditions which have to be met before the controller reads the coolant level sensor.

Furthermore, a deflection-sensitive, coolant-activated system for detecting a drain plug for high-voltage battery packs is known from DE 10 2014 100 008 A1, which is incorporated by reference herein. Accordingly, said document describes a battery pack having a drain plug and a circuit, in order to detect when a liquid coolant has entered the battery pack. The drain plug has a carrier which defines a cavity within the carrier, an inlet which is arranged on a first face of the carrier, and an outlet which is arranged on a second face of the carrier, wherein the first face and the second face are fluidically offset from one another and are coupled to the cavity. A soluble plug can be arranged in the cavity of the carrier; the soluble plug is configured such that it at least partially dissolves when it is fluidically coupled to a coolant, thereby allowing a part of the coolant to flow between the inlet and the outlet and out of the battery pack. A strain gage device interacts with the carrier such that a measured change in resistance in the strain gage device corresponds to the soluble plug in contact with the liquid coolant. An associated circuit with the drain plug notifies the onboard computer systems of the activation of the drain plug.

SUMMARY OF THE INVENTION

Proceeding from the abovementioned prior art, the invention relates to a cooling circuit for a liquid-cooled electric battery, in particular for a liquid-cooled electric battery in an electrically operated vehicle, a liquid-cooled battery arrangement having a liquid-cooled battery, a vehicle having such a liquid-cooled battery arrangement, and the use of a Buchholz relay of the abovementioned type, which allow efficient cooling of battery cells with high operational safety.

Therefore, the invention specifies a cooling circuit for a liquid-cooled electric battery, in particular for a liquid-cooled electric battery in an electrically operated vehicle, having an encircling coolant line, a heat exchanger arranged in the coolant line, and a coolant pump for transporting a cooling liquid through the coolant line, wherein the cooling circuit has a Buchholz relay which is arranged in the coolant line and which has a signal output for connecting to a monitoring unit.

The invention furthermore specifies a liquid-cooled battery arrangement having a liquid-cooled battery, and a cooling circuit as specified above, and a cooling liquid, wherein the liquid-cooled battery is connected to the coolant line, and the cooling circuit and the liquid-cooled battery are filled with the cooling liquid.

The invention likewise specifies a vehicle having a liquid-cooled battery arranged as specified above.

The invention specifies the use of a Buchholz relay to identify insulation faults in a cooling circuit for a liquid-cooled electric battery, in particular for a liquid-cooled electric battery in an electrically operated vehicle.

Using the Buchholz relay in the cooling circuit provides an efficient means in order to be able to detect insulation faults in the cooling circuit. The Buchholz relay is known as such in the prior art and is usually used in transformers in order to detect insulation faults or a leak in the cooling circuit. It is precisely that function that the Buchholz relay also performs according to aspect of the invention within the cooling circuit of batteries for vehicles, in particular in batteries for driving the vehicle. By way of the Buchholz relay, the cooling circuit itself can be effectively monitored, wherein different kinds of faults can be detected. This fault detection can start even before a fault is visible for example as a result of a dropping level in a storage tank.

The liquid-cooled electric battery is preferably a high-power battery with a plurality of individual cells. The cells are connected together in parallel and in series in the battery in order to achieve desired voltages and currents. Preferably, the battery is embodied with a voltage of more than 100 V, particularly preferably with a voltage of several hundred volts.

The electrically operated vehicle is preferably a purely electric vehicle which has only an electric drive. Alternatively, the electrically operated vehicle can also be a vehicle with an electric drive and a conventional drive, which is known for example as a hybrid vehicle.

The encircling coolant line can be embodied for example a hose line or pipeline. Of course, the coolant line can also comprise a combination thereof.

The heat exchanger is a heat exchanger known per se, through which for example air flows. To this end, an active air feed to the heat exchanger can be provided, for example in the form of a fan.

The coolant pump effects circulation of the cooling liquid through the coolant line, in order to guide heat from the battery to the heat exchanger.

The Buchholz relay typically comprises a tank with an upper and a lower float, which allow two-stage monitoring of the cooling liquid in the coolant line. Depending on a state of the cooling liquid in the tank, an electrical contact is established by the two floats, in each case independently, said contact being signaled to the monitoring unit via the signal output. Accordingly, for example a switch can be opened or closed. Thus, minor faults in the cooling circuit can be detected reliably.

In addition, the Buchholz relay can have a blocking slide. In the event of major faults, a sudden excess pressure arises, causing a strong oil flow. In this case, with the aid of the blocking slide, a switch is activated, this likewise being signaled to the monitoring unit. The switch can be opened or closed by the blocking slide. The Buchholz relay preferably has, on a top side of its housing, a pipe connection via which a gas in the tank can be removed, for example for analysis. The composition of the gas can be used to conclude that there is a fault in the cooling circuit. The Buchholz relay is preferably arranged in an upper region of the cooling circuit.

In an advantageous configuration of the invention, the cooling circuit has a compensation and/or storage tank which is connected to the coolant line. By way of the compensation tank, a for example temperature-related change in volume of the cooling liquid can be compensated. By way of the storage tank, cooling liquid can be fed to the cooling circuit as required, for example in the event of minor leaks. Compensation and storage tanks can be realized in a single tank.

In an advantageous configuration of the invention, the cooling liquid is an electrically insulating liquid. As a result, it is possible, in principle, to guide the cooling liquid close to the individual cells, or even to make the cooling liquid flow directly around the cells. In this way, effective and uniform heat transfer from the individual cells to the cooling liquid can be ensured.

In an advantageous configuration of the invention, the cooling liquid is an oil. Oils can effect efficient cooling of the battery. At the same time, the circulation of only a small quantity of the oil can ensure reliable removal of heat from the cells of the battery. On account of the consistency of oil, leaks can be detected and located easily.

In an advantageous configuration of the invention, the liquid-cooled battery is embodied as a lithium-ion battery or the like. Corresponding lithium-ion batteries have a high storage capacity in order to allow the provision of a vehicle with a large range, and are also characterized by good charging and discharging properties.

In an advantageous configuration of the invention, the liquid-cooled battery has continuous cooling ducts through which the cooling liquid flows. Thus, heat can be transferred from the interior of the battery to the cooling liquid quickly and efficiently. Given a suitable arrangement of the cooling ducts with a small spacing, only small temperature differences in the battery can arise.

In an advantageous configuration of the invention, the liquid-cooled battery arrangement has a monitoring unit which is connected to the signal output of the Buchholz relay. The monitoring unit monitors the Buchholz relay. As soon as signaling is effected by way of one of the floats or the blocking slide, this is detected by the monitoring unit. The monitoring unit can be for example part of a battery management system. The monitoring unit signals the fault in the cooling circuit to the vehicle, such that for example the battery is deactivated.

BRIEF DESCRIPTION OF THE DRAWINGS

The invention is explained by way of example in the following text with reference to the appended drawings and using preferred exemplary embodiments, wherein the features presented below can represent one aspect of the invention in each case individually and in combination.

In the drawings

DETAILED DESCRIPTION OF THE INVENTION

Figure 1:
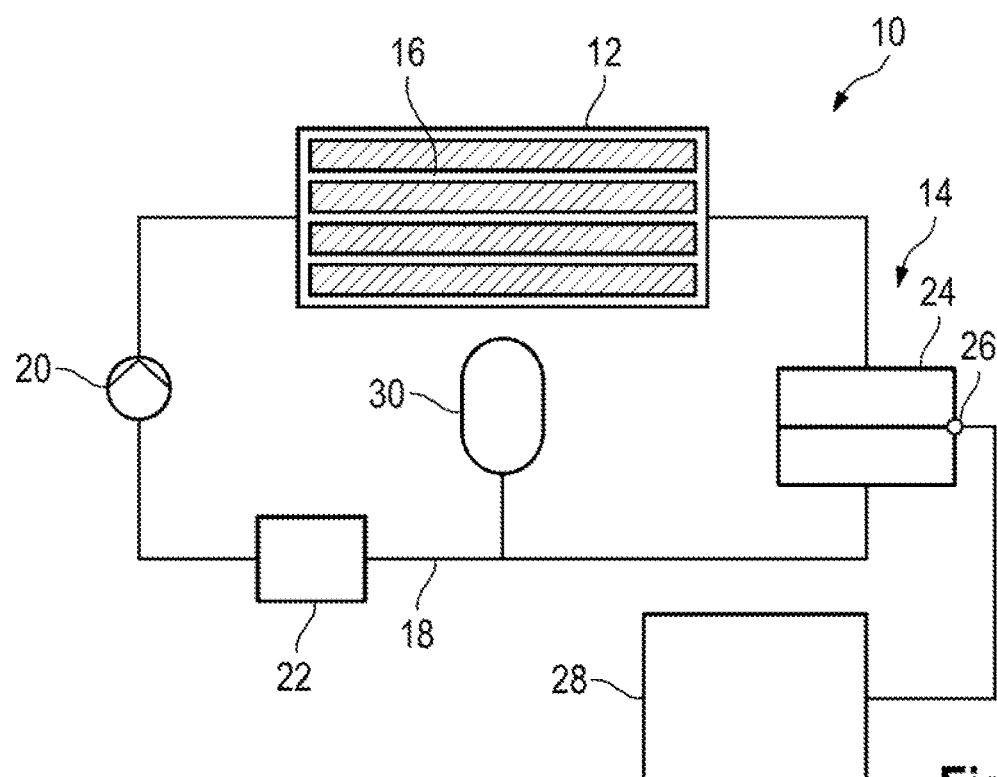
FIG. 1 shows a schematic illustration of a liquid-cooled battery arrangement with a liquid-cooled battery and a cooling circuit with a Buchholz relay according to a first, preferred embodiment.

FIG. 1 shows a liquid-cooled battery arrangement 10 according to aspect of the invention according to a first, preferred embodiment.

The battery arrangement 10 comprises a liquid-cooled battery 12 and a cooling circuit 14 through which a cooling liquid circulates. The cooling liquid is an electrically insulating oil in this exemplary embodiment.

The liquid-cooled battery 12 is a high-power battery with a plurality of individual cells which are connected together in parallel and in series in the battery 12 in order to achieve a desired combination of voltage and maximum current. The battery 12 is embodied with a voltage of more than 100 V. The liquid-cooled battery 12 is embodied as a lithium-ion battery in this exemplary embodiment. The battery 12 has continuous cooling ducts 16 through which the cooling liquid flows.

The cooling circuit 14 comprises an encircling coolant line 18 which is connected to the liquid-cooled battery 12. The coolant line 18 is embodied as a hose line or pipeline or a combination thereof.

Arranged in the coolant line 18 is a coolant pump 20 for transporting the cooling liquid through the coolant line 18 and the battery 12. The coolant pump 20 effects circulation of the cooling liquid through the coolant line 18 and the battery 12, in order to dissipate heat from the battery 12.

Also arranged in the coolant line 18 is a heat exchanger 22. The heat exchanger 22 is a heat exchanger 22 known per se, through which air flows. To this end, according to the present embodiment, an active air feed to the heat exchanger 22 is provided.

Furthermore, the cooling circuit 14 has a Buchholz relay 24 which is arranged in an upper region of the coolant line 18. The Buchholz relay 24 comprises a signal output 26 for connecting to a monitoring unit 28 of the battery arrangement 10. The structure and function of the Buchholz relay 24 are described in detail in the following text with reference to FIGS. 2 to 4.

The cooling circuit 14 also comprises a compensation and storage tank 30 which is connected to the coolant line 18.

Figure 3:
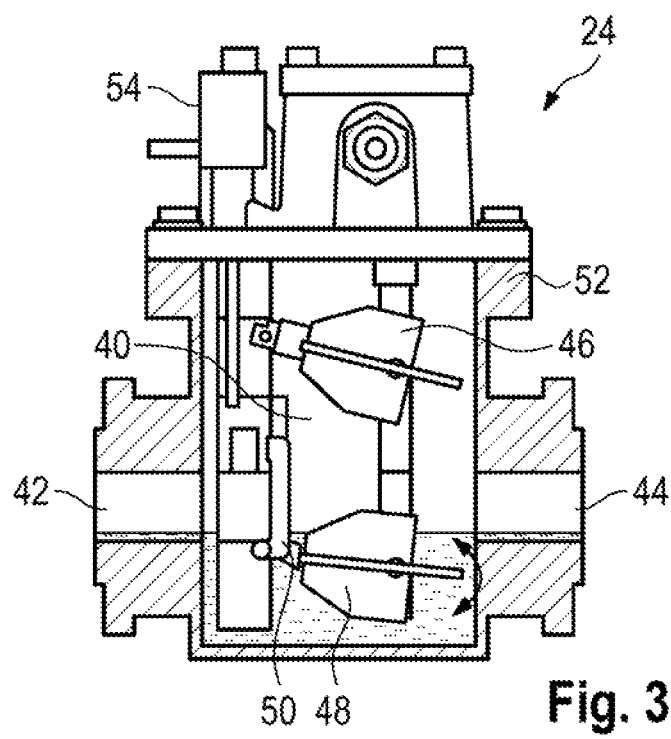
FIG. 3 shows a detailed sectional view of the Buchholz relay from FIG. 1 in an operating state with too little cooling liquid.
Figure 4:
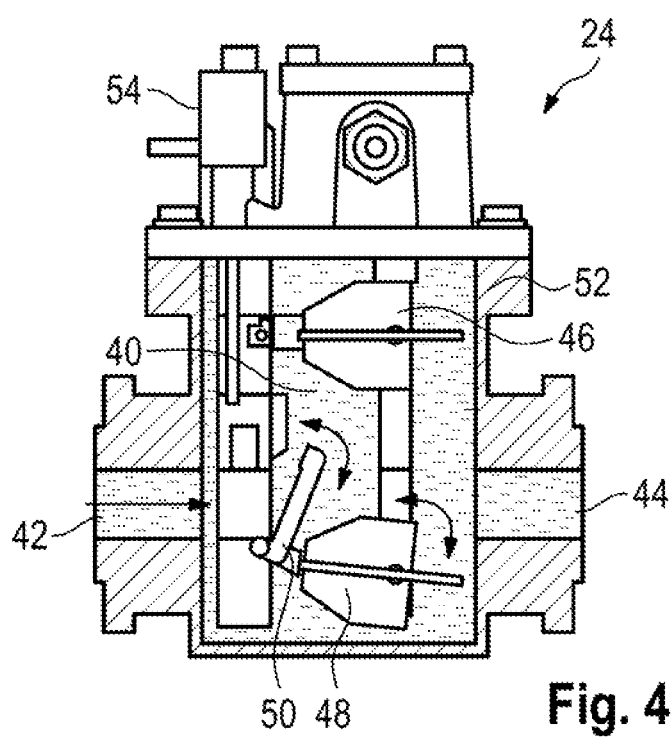
FIG. 4 shows a detailed sectional view of the Buchholz relay from FIG. 1 in an operating state with a blocking slide actuated by an excess pressure in the cooling circuit.

The structure and function of the Buchholz relay 24 in FIG. 1 are described in detail in the following text with reference to FIGS. 2 to 4. The Buchholz relay 24 in FIGS. 2 to 4 is in each case the same Buchholz relay 24 in different operating states.

The Buchholz relay 24 comprises a tank 40 which is connected to an inlet 42 and an outlet 44 with the coolant line 18. Arranged in the tank 40 are an upper and a lower float 46, 48 which allow two-stage monitoring of the cooling liquid in the coolant line 18. In addition, the Buchholz relay 24 has, in the tank 40, a blocking slide 50 which is arranged at the inlet 42. On a top side of its housing 52, the Buchholz relay 24 has a pipe connection 54 via which a gas in the tank 40 can be removed.

Figure 2:
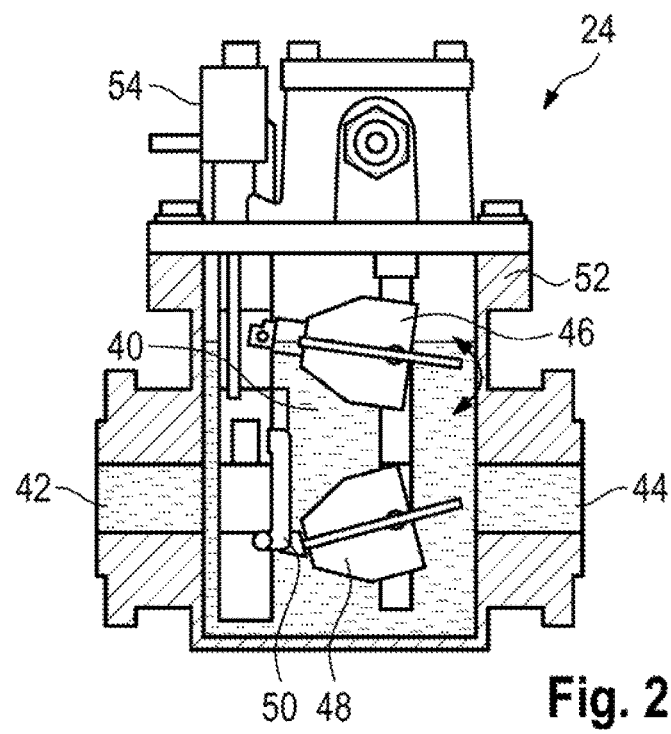
FIG. 2 shows a detailed sectional view of the Buchholz relay from FIG. 1 in an operating state with gas accumulation in its tank.

As illustrated in FIG. 2, gas from the cooling liquid can accumulate in the tank 40. In this operating state, the gas displaces the cooling liquid. As the level of the cooling liquid goes down, the upper float 46 drops. As a result of the movement of the upper float 46, a switching contact (not illustrated), which can comprise for example a magnetic switching tube, is actuated. The Buchholz relay 24 is embodied such that the gas flows away to the compensation and storage tank 30 starting from a particular gas quantity. As a result, the lower float 48 cannot be influenced.

The monitoring unit 28 monitors the Buchholz relay 24. As soon as signaling is effected by the upper float 46, i.e. as soon as the switching contact is actuated, this is detected by the monitoring unit 28. The monitoring unit signals the fault in the cooling circuit 14 for example by triggering a warning.

FIG. 3 illustrates an operating state in which the level of the cooling liquid in the cooling circuit 14 has dropped on account of leaks. Together with the liquid level in the tank 40, first of all the upper float 46 drops, with the result that a warning is triggered as described above. With continued liquid loss, the tank 40 empties further. As the liquid level continues to go down, the lower float 48 also drops. As a result of the movement of the lower float 48, a further switching contact is actuated. This is detected by the monitoring unit 28. The monitoring unit 28 signals the fault in the cooling circuit 14 for example by triggering an expanded warning.

FIG. 4 illustrates an operating state in which, as a result of a spontaneous event, a pressure wave arises. This results in an excess pressure at the inlet 42 of the tank 40, with the result that the blocking slide 50 moves into the tank 40. The pressure wave strikes the lower blocking flap 50 arranged in the liquid flow. If the flow velocity exceeds the response sensitivity of the blocking flap 50, the latter moves, as described, in the direction of flow. As a result of this movement, the lower float 48 is moved downward and the corresponding switching contact actuated. This actuation of only the lower float 48 is detected by the monitoring unit 28. The monitoring unit 28 signals a major error in the cooling circuit 14 for example by triggering a special warning.

What is claimed is:
1. A liquid-cooled battery arrangement comprising:
a liquid-cooled battery,
a cooling liquid, and
a cooling circuit comprising an encircling coolant line, a heat exchanger arranged in the coolant line, a coolant pump for transporting a cooling liquid through the coolant line, and a Buchholz relay which is arranged in the coolant line and which has a signal output for connecting to a monitoring unit, wherein the liquid-cooled battery is connected to the coolant line, and the cooling circuit and the liquid-cooled battery are filled with the cooling liquid.

2. The liquid-cooled battery arrangement as claimed in claim 1, wherein the cooling liquid is an electrically insulating liquid.

3. The liquid-cooled battery arrangement as claimed in claim 1, wherein the cooling liquid is an oil.

4. The liquid-cooled battery arrangement as claimed in claim 1, wherein the liquid-cooled battery is embodied as a lithium-ion battery.

5. The liquid-cooled battery arrangement as claimed in claim 1, wherein the liquid-cooled battery has continuous cooling ducts through which the cooling liquid flows.

6. The liquid-cooled battery arrangement as claimed in claim 1 further comprising a monitoring unit which is connected to the signal output of the Buchholz relay.

7. A vehicle having a liquid-cooled battery arrangement as claimed in claim 1.

* * * * *